United States Patent [19]

Ganther

[11] Patent Number: 4,581,648
[45] Date of Patent: Apr. 8, 1986

[54] VIDEO CAMERA SYSTEM

[75] Inventor: Howard B. Ganther, Lake Park, Fla.

[73] Assignee: Lenzar Optics Corporation, Riviera Beach, Fla.

[21] Appl. No.: 618,082

[22] Filed: Jun. 7, 1984

[51] Int. Cl.⁴ .............................................. H04N 5/30
[52] U.S. Cl. ..................................... 358/211; 358/209
[58] Field of Search ............... 358/211, 219, 209, 224, 358/225, 228; 250/578

[56] References Cited

U.S. PATENT DOCUMENTS

| | | | |
|---|---|---|---|
| 3,079,851 | 3/1963 | Back | 358/228 |
| 3,086,077 | 4/1963 | Mayer | 178/7.2 |
| 3,553,363 | 1/1971 | Anderson | 178/7.2 |
| 3,555,181 | 1/1971 | Thommen | 178/7.2 |
| 3,576,393 | 4/1971 | Thompson | 178/7.2 |
| 3,691,302 | 9/1972 | Gaebele | 178/7.2 |
| 3,848,085 | 11/1974 | Van Atta | 178/7.2 |
| 3,891,795 | 6/1975 | Johnson et al. | 358/211 |
| 3,974,331 | 8/1976 | Pepin | 178/7.2 |
| 4,025,955 | 5/1977 | Grallien | 358/219 |
| 4,141,043 | 2/1979 | Liu | 358/219 |
| 4,158,859 | 6/1979 | Kerbel | 358/228 |
| 4,190,864 | 2/1980 | Dischert | 358/210 |
| 4,318,132 | 3/1982 | Machida | 358/228 |

Primary Examiner—Gene Z. Rubinson
Assistant Examiner—Stephen Brinich
Attorney, Agent, or Firm—Costas, Montgomery & Dorman

[57] ABSTRACT

A video camera system adapted for low light levels and daylight where a prism is selectively movable to present an image to one of two optical paths for either mode of operation. In the low light level mode of operation, a relay lens is provided to relay the output of a light intensifier to the target of a vidicon.

14 Claims, 7 Drawing Figures

VIDEO CAMERA SYSTEM

FIELD OF THE INVENTION

This invention relates to video camera systems, and more particularly, relates to a low light level video system, which may also be operated during daylight hours.

BACKGROUND OF THE INVENTION

Low light level video camera systems utilizing image intensifiers have long been used for night surveillance or investigation. Heretofore, such known systems have been rather bulky. Also, such low light level TV pick-up systems are adapted for operation only under low light level conditions and due to the image intensifier, cannot operate under lighting conditions where the ambient light is above a given level. Each basic system has merit in a limited area but none to date are known to use to best advantage the multiple sciences available.

Low light level video camera systems comprise a lens followed by a light intensifier and a vidicon. All electrostatic intensifiers use fibre optic plates on their input and output. This requires the use of a fibre optics faceplate on the intimately coupled vidicon or a fibre optic coupling member as disclosed in U.S. Pat. No. 3,553,363. Thus, the image scanned by the vidicon is the fibre optics plate of the intensifier or the fibre optic coupling member. In these arrangements, the gain of the intensifier is controlled by controlling the high voltage on the intensifier as a function of a vidicon signal. Such an arrangement is disclosed in U.S. Pat. No. 4,025,955.

One system makes use of a multiple of electrostatically focused intensifiers in tandem whose output is intimately coupled to a pickup tube (generally a vidicon). The output from the vidicon is used to provide the conversion to a video signal for modulating a cathode ray tube after amplification to the required levels. This system (one-two or three electrostatic image intensifiers in tandem) provides light gains in the order of 200 to 8 million. These gains are unrealistic and unusable. Noise from the first intensifier is amplified by the second and then again amplified by the third. The end result is that the signal to noise ratio is primarily defined by the first intensifier and therefore the gain of each state must be limited. Effective gains in the order of 40-100,000 are realistic but above gains of 25,000 amplified noise inhibits the low light usability.

A second system makes use of what is generally called a second generation intensifier. The second generation differs from the electrostatically focused intensifier by the addition of a microchannel plate amplifier between the photocathode input and phosphor screen output. Gains in the order of 35-70,000 are effectively realized with equivalent noise inputs of $1 \times 10^{-11}$ foot candles.

All electrostatic intensifiers use fibre optics plates on their input and output. This then requires the use of a fibre optics faceplate or coupler on the intimately coupled vidicons used in low light level video systems. Such arrangements are exemplified in U.S. Pat. Nos. 3,553,363 and 3,974,331.

A third system utilizes what is called a silicon-intensified-target vidicon or an intensified silicon-intensified-target. The gains of these third systems are nearly equal to the second-generation-vidicon arrangement but lack an important effect of the latter.

The second-generation intensifier output is a visible image from a phosphor screen, the decay time of which provides integration of the electron images between electron beam scans of the vidicon target. The third systems are non-integrating, producing a signal that must be stored externally in the form of multiple scans to realize similar signal to noise ratios.

To realize the potential resolution and low light capability of a second-generation intensifier, it requires an accellerating potential such that a bright image is displayed for presentation to the vidicon. The dynamic range of this output image is limited to a level of about five magnitudes.

The vidicon pickup tubes on the other hand are effective over about three to four magnitudes. In a close (intimate) coupled system, the signal from the vidicon is compressed at the higher brightness levels by target current limiting. The result is poor interscene dynamic range and blooming of highlights. Sulfide target vidicons have reasonable dynamic range but have poor noise ratios at low brightness levels. Silicon target vidicons have excellent noise ratios at low levels but have limited dynamic range.

Accordingly, the present invention provides a compact, new and improved low light level video camera system which may also be operated during daytime without damage to the vidicon tube and intensifier.

SUMMARY OF THE INVENTION

Briefly stated, the invention in one form thereof comprises a housing and a main lens with two optical systems disposed in the housing, one which includes a light intensifier. Positioned along a first optical axis is the lens, a light intensifier, a relay lens, and a vidicon tube. The optical axis is folded between the intensifier and the relay lens, and the relay lens and the vidicon. A mirror prism is movable between the lens and the intensifier to direct light from the lens along a second optical axis to a second camera system which may comprise a lens and a vidicon. When the second system is utilized, the mirror reflects the light away from the light intensifier along the second optical axis. The relay lens provides an optical coupling of the intensifier and the first vidicon and provides improved resolution by permitting the use of an intensifier having a greater image format than the vidicon.

An object of this invention is to provide a new and improved video camera system having low light level capability.

Another object of this invention is to provide a video camera system which will permit surveillance from full daylight to extremely low light level operation.

A further object of this invention is to provide a new and improved video camera system, with low light capability, which is extremely compact.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENT OF THE INVENTION

Figure 1:
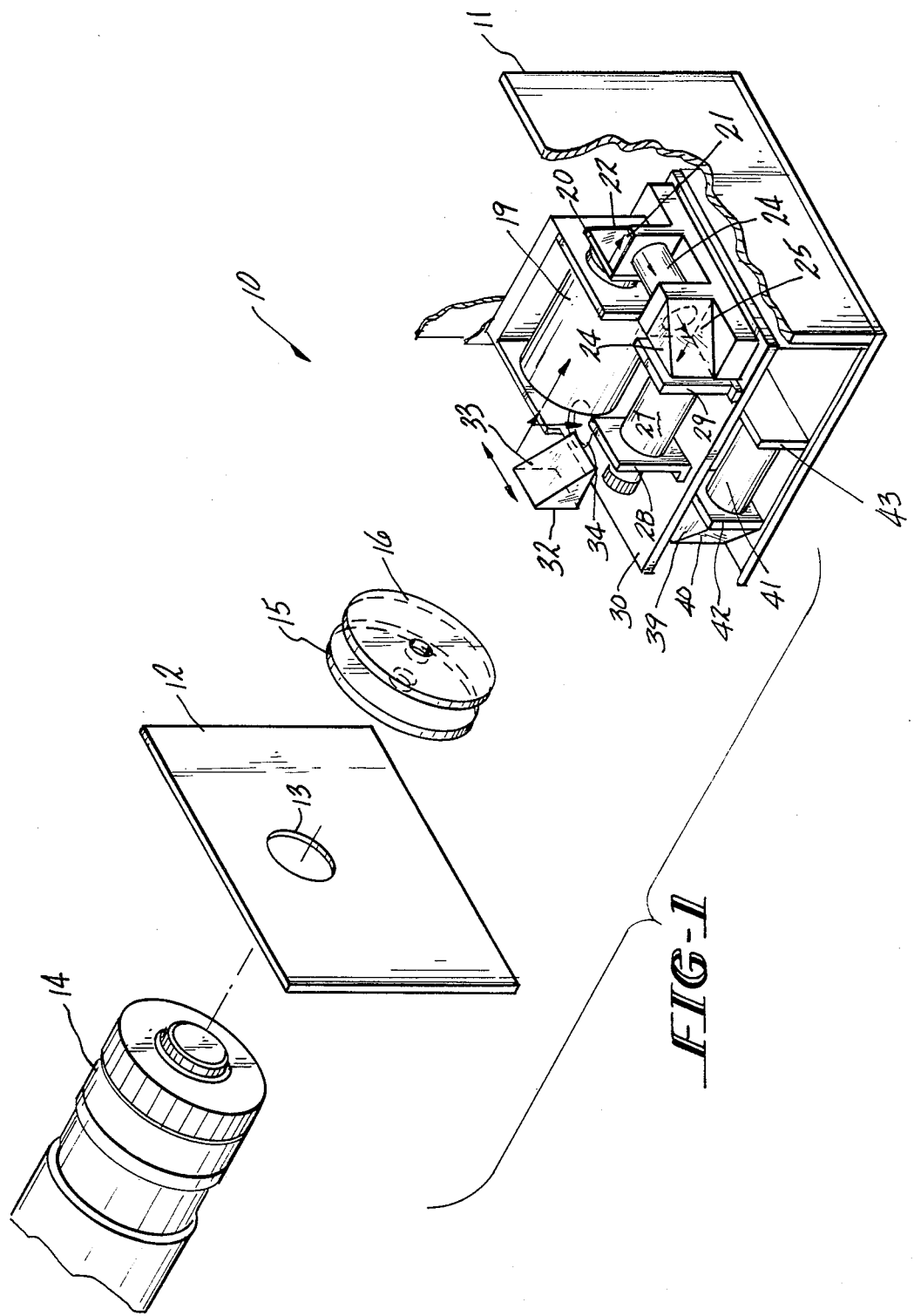
FIG. 1 is an exploded perspective view of a camera embodying the invention.

As shown in FIG. 1, the system 10 comprises a housing member 11 which is partially cut away and has a front wall 12 defining a mounting aperture 13 for a lens 14 having an otical axis A.

Disposed behind wall 13 are a pair of neutral wedge filters 15 and 16 which are driven by gears 17 and 18 respectively, (FIG. 6) in opposite directions. The wedge filters are of angularly uniform varying optical density so that when driven uniformly in opposite directions. The filters 15 and 16 will attenuate the light exiting lens 14 uniformly throughout the beam of light. The wedge filters 15 and 16 are of a dimension to completely include the diameter of mounting aperture 13. The gears 17 and 18 are motor driven as hereinafter described.

Axially aligned on the optical axis A of lens 14 is a light intensifier 19 mounted on a bracket 20. The intensifier, also known as an image intensifier tube, is available from Varo Electron Devices, Inc. of Galen, Tex. Such intensifiers require no artificial source of light and will present a usable image when only starlight or the faint upper air glow on a cloudy moonless night is available. The optical axis is folded at ninety degrees by a prism 21 providing a mirror surface 22. A field lens 23 (FIG. 3) is positioned between intensifier 19 and prism 21. Light is reflected from mirror surface 22 to relay lens 23 in a housing 24 to a mirror surface 25 of a prism 26. Mirror surface 25 reflects the light to a vidicon 27. Vidicon 27 is supported by brackets 28 and 29 on a platform 30. Platform 30 which divides housing 11 into upper and lower compartments also provides support for the components of the system.

This arrangement permits greater resolution under low light level conditions since the relay lens may reduce a large format image from the intensifier to a smaller format presented to the vidicon tube. Moreover, this arrangement eliminates the usual fibre optic plate on the vidicon or a fibre optic coupling thereto.

The described arrangement further provides a very small and compact optical system which is less than half the length of traditional low light level video cameras, and further provides resolution beyond the usual limits imposed by the intensifier fibre optic face plate.

A prism 32 having a mirror surface 33 is movably positioned with respect to aperture 13 to fold the optical axis A vertically downwardly through an aperture 34 in platform 30. Prism 32 is movable as indicated by arrows 35, as hereinafter described.

Figure 2:
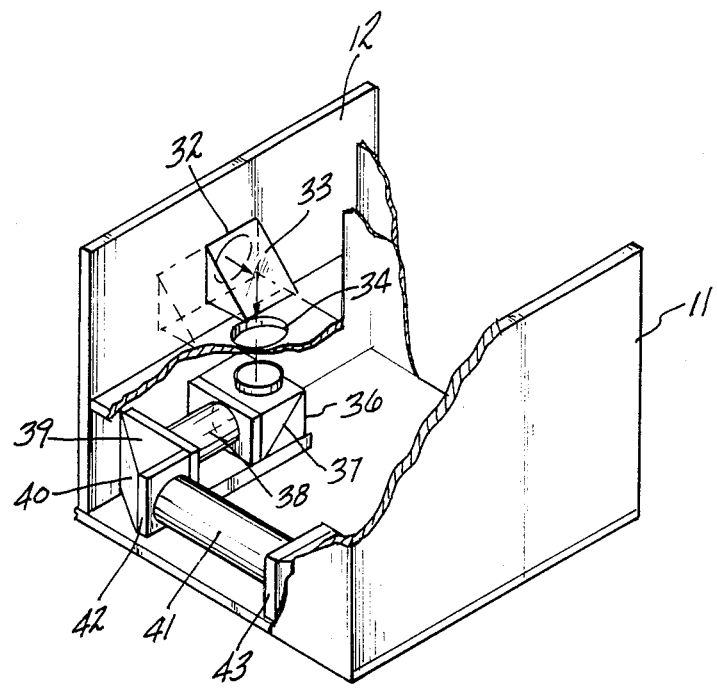
FIG. 2 is a replication of a portion of FIG. 1 with certain parts removed.

Reference is now made to FIG. 2 which further exemplifies housing 11. FIG. 2 also exemplifies wedge 32 positioned such that mirror surface 33 thereof is positioned to fold the axis A ninety degrees downwardly to another prism 36 having a mirror surface 37. The mirror surface 37 then folds the optical axis to the left, as shown in FIG. 2, through housing 38 to a further prism 39 providing a mirror surface 40. Mirror surface 40 again folds the axis A to be coaxial with the axis of a vidicon tube 41. Vidicon tube 41 is mounted on supporting members 42 and 43 resting on the bottom wall 44 of housing 11.

As thus far described, during daylight hours, prism 32 is positioned as shown in FIG. 2 and the incoming light rays are folded to be received by vidicon 41, which may be a color tube.

However, under low light level conditions, prism 32 is moved to the position shown in dotted line in FIG. 2, and as shown in full line in FIG. 1, to permit the light from lens 14 to travel to intensifier 19 and ultimately be received by vidicon 27.

Figure 3:
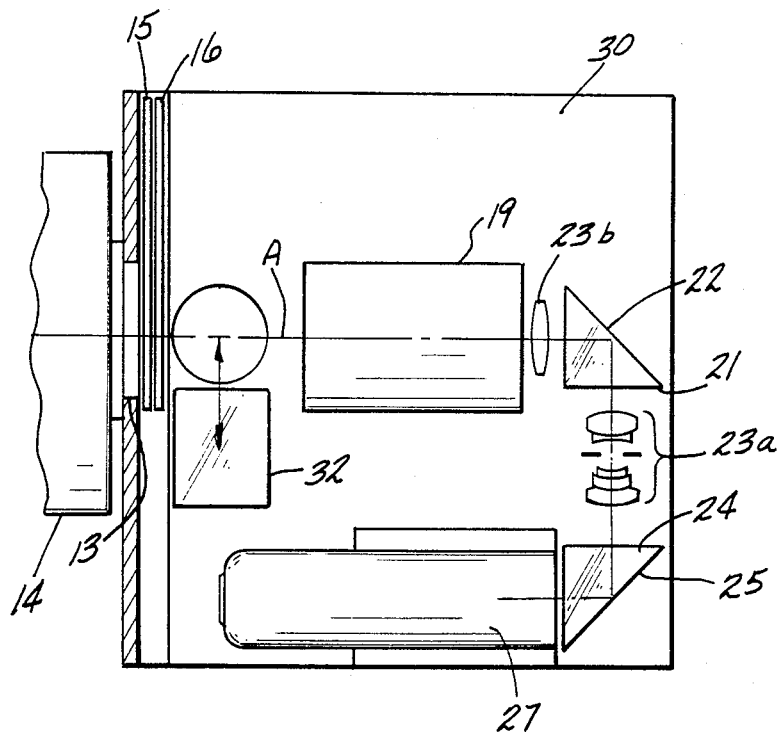
FIG. 3 is a top plan view of the camera of FIG. 1.

FIG. 3 is a plan view of the optical layout on platform 30. Intensifier 19 may have an image frame greater than the image frame of vidicon 27. For example, the diameter of the fibre optic output plate of intensifier 19 may be twenty-five millimeters, while the diameter of the face of vidicon 27 is sixteen millimeters. FIG. 3 also schematically exemplifies relay lens 23 with aperture control iris 23a. A field lens 23b is positioned between intensifier for purposes hereinafter described.

Figure 4:
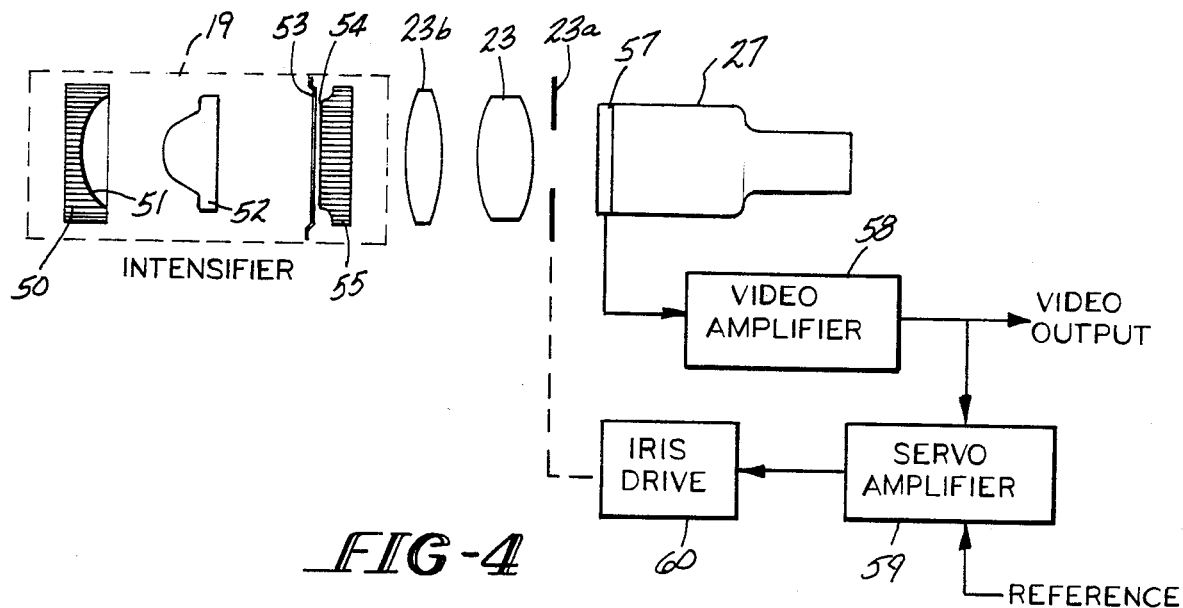
FIG. 4 is a diagram in block and schematic form of the optical system of FIG. 1, together with an iris control therefor.

Reference is now made to FIG. 4, which is a schematic side elevation of the optical system on platform 30 without folding of the optical axis, together with a block diagram of an iris control.

Intensifier 19 receives an image from lens 14 on photo cathode 51 through fibre optic input plate 50. The photons in the image are converted to electrons by photo cathode 51 and amplified and accelerated by anode plate 52 to microchannel plate 53 to screen 54, and converted back to photons. Output fibre optic plate 55 forms an image in descrete pixels. A field lens 23 projects the light image from the fibre optics output plate of intensifier 19 to the pupil of the relay lens 23 in lens housing 24. Relay lens 23 then relays the image from the output screen of intensifier 19 to the input target 57 of vidicon 27.

Intensifier 19 basically comprises a fibre optic input plate 50 with a photo cathode 51 on a concave surface thereof, an anode plate 52, a micro channel plate 53, a phosphor screen 54, and an output fibre optic plate 55.

Field lens 23 projects the image from fibre optics plate 55 to the pupil of relay lens 23. The scanning beam of the vidicon 27 interrogates the descrete points of the target which results in a video signal electronically representative of the descrete points on the target.

The output of the vidicon 27 is processed in a video amplifier 58 and the output thereof is suplied to a video system (not shown). The output of video amplifier 58 is also applied to a detector (not shown separately) and a servo amplifier 59 where it is compared with a reference voltage. The output of servo amplifier 59 is applied to an iris drive 60 which controls the aperture defined by iris 31 in relay lens 24a in accordance with the light incident on vidicon 27. This arrangement of the relay lens 23, iris 23a, and iris drive 60 prevents current overload on the target 57 of vidicon 27, and allows intensifier 19 to be used at its most efficient point. Moreover, the target 57 need not be on the outside of vidicon 27 since relay lens 24 may focus the image of the object on fibre optic plate 55 onto the target 57. This avoids the necessity of an intimate coupling of the fibre optic plate ot the target 57 of vidicon 27 or the necessity of incorporating a fibre optic plate in the target of vidicon 27.

This arrangement also permits ease of servicing or modification since the intensifier and imaging tube are separately replaceable.

The provision of the relay lens also enhances the resolution of the system. This permits a larger format image to be provided by the intensifier 19 with respect to the target of the vidicon 26. For example, intensifier 19 may have a diameter of twenty-five millimeters while the diameter of the target of vidicon 26 is sixteen millimeters. Thus, the reduction in format provides greater resolution.

Figure 5:
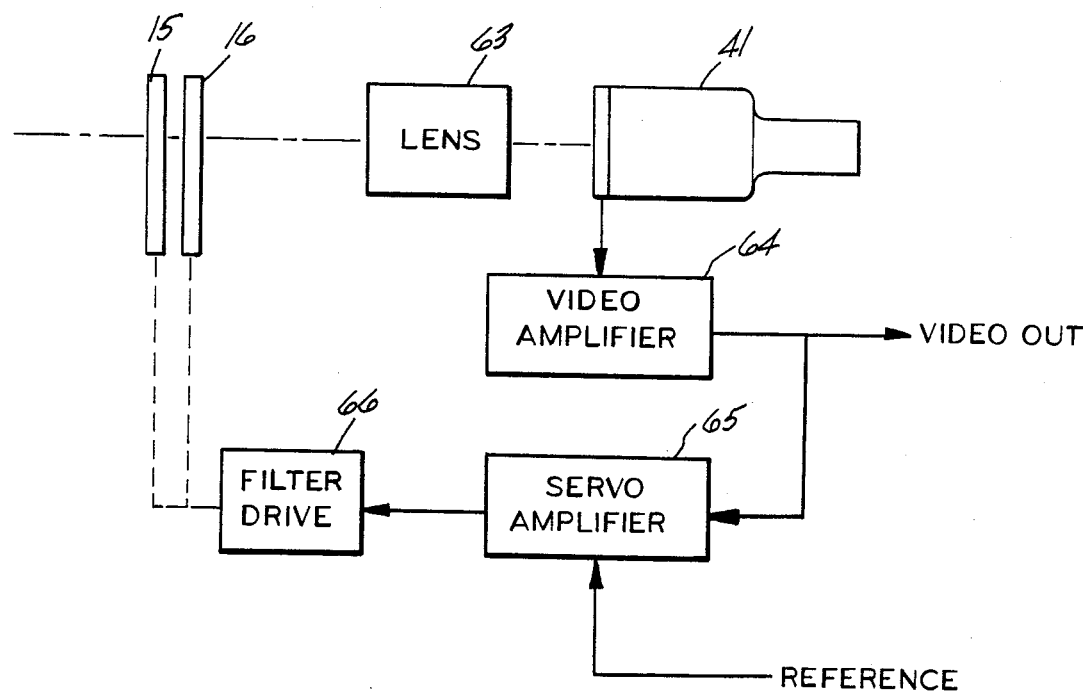
FIG. 5 is a schematic diagram in block and schematic form of the optical system of FIG. 2, together with a light control therefor.

FIG. 5 exemplifies the optical system of FIG. 2 with electronic circuitry for controlling the position of filters 15 and 16. Filters 15 and 16 are generally utilized only in conjunction with vidicon 41 or if the lens 14 is a catadioptric lens. If the lens 14 is a catadioptric lens, then the wedge filters 15 and 16 will be utilized instead of the iris 31. Light from the lens 14 passes through filters 15 and 16 and is folded ninety degrees by mirror surface 33 of prism 32, again folded by mirror surface 37 of prism 36, again folded by mirror surface 40 of prism 39 and transmitted by lens 63 to vidicon 41. The lens 63 may or may not be utilized depending on the size format of vidicon 41. Dependent upon the size of vidicon 41, lens 63 may magnify or reduce the size of the transmitted image. A video amplifier 64 receives the stand signal from the target of vidicon 41 and provides a video signal output to the receiving portion of the system. The output of video amplifier 64 is also detected and applied to a servo amplifier 69, where it is compared with a reference signal. Any error signal is applied to wedge filter drive member 66 to rotate the filters 15 and 16 to control the light incident on the target of vidicon 41.

Figure 6:
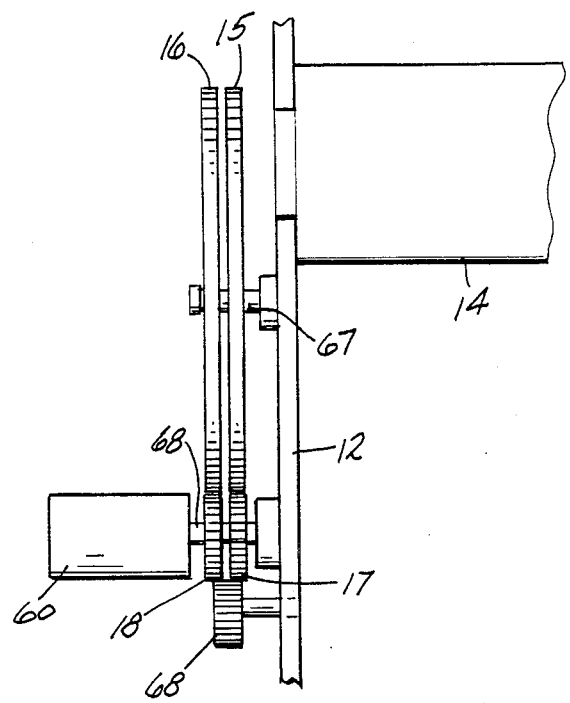
FIG. 6 is a diagram of the housing of FIG. 1, cut away to show a mechanism for moving the filters of FIGS. 1.

The filters 15 and 16 are annular in shape as shown in FIG. 6, and are rotatable on a shaft 67 carried from front wall 12. The filters 15 and 16 have gear teeth defined on the periphery thereof, or on a frame for the filters which mesh with gears 17 and 18 respectively. Gear 18, which is fast on motor shaft 68, is directly driven by filter drive motor 66. Gear 17 which rotates on shaft 68 is driven through an idler gear 69 supported on a shaft 70 extending from front wall 12. This produces contra rotation of filters 15 and 16. The filters are angularly uniformly graduated, thus the light attenuation is uniform across opening 13.

Figure 7:
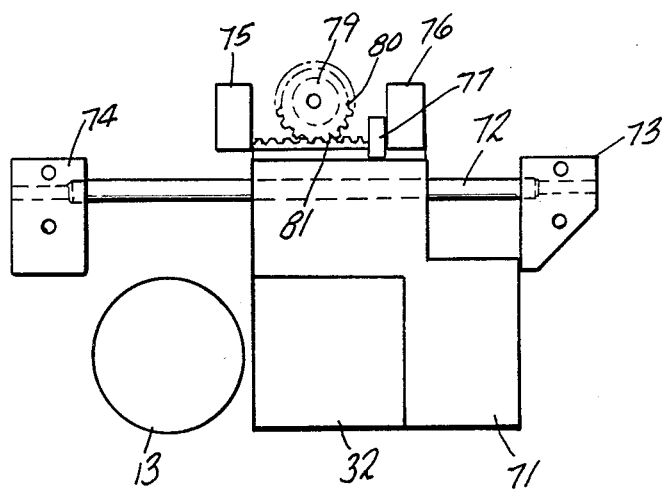
FIG. 7 is a diagram of the mechanism for moving a prism shown in FIG. 1.

FIG. 7 exemplifies the drive for prism 32. Prism 32 is mounted in a carrier 71 which is slideable on two parallel guide rods 72 (only one shown). Guide rods 72 are supported from brackets 73 and 74 affixed to front wall 12. Limit switches 75 and 76 are positioned on front wall 12 to limit motion of carrier 71. A limit switch actuating lug 77 is provided on carrier 71 to actuate and halt movement of carrier 71 at its limits of travel. The limits of travel of carrier 71 either position carrier 71 beyond opening 13 or in a position to fold the optical axis of lens 14 toward mirror surface 37. A wedge drive motor 79 has a gear 80 meshing with a rack 81 on carrier 71. Motor 79 is effective to drive carrier 71 with prism 32 thereon between the positions defined by limit switches 75 and 76. Operation of motor 79 to position prism 32 for low light level or daylight operation may be under manual operator control or controlled by a photosensitive device.

In operation, during daylight hours, prism 32 is positioned as shown in FIG. 2 to fold the optical axis A to mirror surface 37 which folds the optical axis to mirror surface 40 which, in turn, folds the optical axis to coincide with the axis of the vidicon 41. Under these conditions of operation, the intensity of the light presented to vidicon 41 is controlled by the positioning of wedge filters 15 and 16 in response to the light incident on the target of vidicon 41.

Under low light levels, the operator will energize motor 79 to move prism 32 to the position shown in FIG. 7. The operator may simultaneously de-energize vidicon 41 and energize intensifier 19 and vidicon 27. At this time, the wedge filters 15 and 16 will be positioned to present the least attenuation to the light exiting lens 14, and the light intensity on the target 57 of vidicon 27 is determined by iris 23a.

In the event that lens 14 is a catadioptric lens, the iris 23a need not be included in relay lens 23 or, alternatively, the iris drive 60 is disconnected and the iris set at maximum aperture. Then the intensity of light, either to vidicon 27 or vidicon 41, is controlled by the wedge filters 15 and 16. It will be understood that the iris drive 60 of FIG. 4 may be replaced by a wedge filter drive.

It may thus be seen that the objects of the invention set forth, as well as those made apparent from the foregoing description, are efficiently attained. Preferred embodiments of the invention have been set forth for purposes of disclosure; however, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus described the invention, what is claimed is:

1. A video camera system comprising an objective lens, an image intensifier, a relay lens and a first vidicon having a target on a common optical axis, said objective lens arranged to provide an image of an object to the input of said intensifier, said relay lens relaying the image at the output of said image intensifier to the target of said first vidicon, an iris in said optical path between said image intensifier and said first vidicon, means for varying the aperture of said iris as a function of the video signal from said target, a first mirror movably mounted in said housing between said objective lens and said intensifier, said first mirror being movable between positions where light from said objective lens is incident on said intensifier and where the said first mirror folds the optical axis of said objective lens vertically downward through a partition in said housing to a lower compartment, and second and third mirrors and a second vidicon in said lower compartment, said second and third mirrors folding the optical axis from said movable mirror to said second vidicon.

2. The camera system of claim 1 further including additional mirrors folding said optical axis horizontally between said image intensifier and said relay lens, and between said relay lens and said first vidicon.

3. The camera system of claim 1 where the image area at the output of said image intensifier is greater than the area of the target of said first vidicon.

4. The camera system of claim 1 further comprising a pair of rotatable wedge filters positioned between said objective lens and said intensifier and means for rotating said filters in opposite directions.

5. A video camera system comprising an objective lens, an image intensifier, a relay lens and a first vidicon having a target on a common optical axis, said objective lens arranged to provide an image of an object to the input of said image intensifier, said relay lens relaying the image at the output of said image intensifier to the target of said first vidicon, a pair of wedge filters in the optical path between said image intensifier and said objective lens, means for varying the position of said filters as a function of the video signal from said target, a first mirror movably mounted in said housing between said objective lens and said intensifier, said first mirror being movable between positions where light from said objective lens is incident on said intensifier and where said first mirror folds the optical axis of said objective lens vertically downward through a partition in said housing to a lower compartment, and second and third mirrors and a second vidicon in said lower compartment, said second and third mirrors folding the optical axis from said movable mirror to said second vidicon.

6. The camera system of claim 5 further including additional mirrors folding said optical axis horizontally between said image intensifier and said relay lens, and between said relay lens and said first vidicon.

7. The camera system of claim 5 where the image area at the output of said image intensifier is greater than the area of the target of said first vidicon.

8. The camera system of claim 5 where said wedge filters are rotatably mounted for movement in opposite directions.

9. A video camera system comprising a housing member, an objective lens, means on said housing member for mounting said objective lens thereto, an image intensifier, a relay lens and a first vidicon having a target on the same optical axis as said objective lens, said relay lens relaying an image from the output of said intensifier to said target, a mirror movable from a position permitting optical communication between said objective lens and said image intensifier to a position to reflect light from said objective lens on a second optical axis, and a second vidicon on said second optical axis.

10. The camera system of claim 9 where said image intensifier and said relay lens are mounted on a partition in said housing and additional mirrors fold said first optical axis between said intensifier and said relay lens and said vidicon.

11. The camera system of claim 9 where the image area at the output of said image intensifier is greater than the area of the target of said first vidicon.

12. The camera system of claim 9 further comprising a pair of rotatable wedge filters positioned between said objective lens and said intensifier and means for rotating said filters in opposite directions.

13. The camera system of claim 9 where said movable mirror when positioned behind said objective lens reflects light substantially perpendicular to said first optical axis, and second and third mirrors positioned on said second optical axis to reflect light to said second vidicon.

14. The camera system of claim 9 further including an iris positioned between said intensifier and said first vidicon, and means for varying the aperture of said iris as a function of the video signal from said target.

* * * * *